United States Patent
Sommer

(10) Patent No.: US 7,029,609 B2
(45) Date of Patent: *Apr. 18, 2006

(54) COMPOSITION WHICH CAN BE FOAMED FROM A PRESSURIZED CONTAINER FOR PRODUCING INSULATING FOAMS

(75) Inventor: Heinrich Sommer, Appenzell (CH)

(73) Assignee: Rathor AG, (CH)

( * ) Notice: Subject to any disclaimer, the term of this patent is extended or adjusted under 35 U.S.C. 154(b) by 352 days.

This patent is subject to a terminal disclaimer.

(21) Appl. No.: 10/181,236

(22) PCT Filed: Jan. 4, 2001

(86) PCT No.: PCT/EP01/00035

§ 371 (c)(1),
(2), (4) Date: Oct. 22, 2002

(87) PCT Pub. No.: WO01/49779

PCT Pub. Date: Jul. 12, 2001

(65) Prior Publication Data

US 2003/0094720 A1    May 22, 2003

(30) Foreign Application Priority Data

Jan. 7, 2000    (DE)    ................. 100 00 327

(51) Int. Cl.
  *B29C 65/00*    (2006.01)
  *C08J 9/00*    (2006.01)
  *A61K 9/14*    (2006.01)

(52) U.S. Cl. ............................. 264/41; 424/486; 521/97
(58) Field of Classification Search .................. 264/41; 424/486; 521/97

See application file for complete search history.

(56) References Cited

U.S. PATENT DOCUMENTS 6,057,376 A * 5/2000 Bass et al. ..................... 521/64
6,340,715 B1 * 1/2002 Sommer ..................... 521/114

FOREIGN PATENT DOCUMENTS

WO    WO 98 12248    3/1998

* cited by examiner

*Primary Examiner*—Suzanne E. McDowell
(74) *Attorney, Agent, or Firm*—Fulbright & Jaworski LLP

(57) ABSTRACT

The invention relates to a composition which can be foamed from pressurized containers. Said composition is based on an aqueous plastic dispersion containing an aqueous dispersion of at least one film-forming plastic material consisting of 30% to 80% by weight of a film-forming plastic material, a propellant gas amounting between 3% to 25% by weight in relation to the entire composition and one or more ionic foam stabilizers amounting between 0.3 and 6% by weight in relation to the entire composition. The foamed compositions can he used as scaling, damping and insulating materials.

18 Claims, No Drawings

COMPOSITION WHICH CAN BE FOAMED FROM A PRESSURIZED CONTAINER FOR PRODUCING INSULATING FOAMS

The invention relates to a composition that can be foamed from pressurized containers to produce stable insulating foams on the basis of an aqueous plastic dispersion. The composition is in particular suited to produce insulating foams for use in the building trade.

The composition according to the invention serves to produce insulating foams that are primarily used for heat and moisture insulating applications involving the foam-filling of hollow spaces. Main fields of application are in the building trade but also technical products involving hollow spaces to be filled in order to prevent condensation water from accumulating. Furthermore, such compositions can be employed for producing seals, e.g. sealing strips.

Especially in the building sector polyurethane foams are frequently used that are characterized by a prepolymer composition being released from pressurized containers, for example aerosol containers, with the help of propellants and produced and applied locally and having a weight per unit of volume ranging between 10 and 100 g/l. The so-called 1-component foams have moisture-hardening qualities, i.e. they consist of a component, namely isocyanate groups, that reacts with the air humidity. 2-component foams contain reactants in the form of a second component so that the hardening process producing the foam does no longer or not solely depend on the presence of atmospheric humidity. In this case as well the reactive first component contains isocyanate groups that react with hydroxyl or amine groups present in the second component.

Apart from being particularly suitable to yield stable foams the isocyanate groups-containing prepolymers used to produce the customary polyurethane foams have a decisive disadvantage, i.e. the toxicity of the isocyanate containing components. This necessitates special precautionary measures to be taken when filling in, processing and disposing of remaining substances. On the other hand, the PU foams produced have good insulating properties, are non-toxic, durable and can be easily processed and applied.

Compositions containing polyurethane prepolymers react intensely with water. For that reason, systems containing such prepolymers cannot be produced on a water basis. Other liquid components, solvents and/or liquid additives are therefore indispensable as carriers for the foam-producing components. With respect to the selection of such carrier components choices are greatly limited due to the high reactivity of the isocyanate groups. From this point of view it would be desirable to have available foam-producing polymers that could be foamed based on an aqueous dispersion.

Formulations of film-forming polymers together with propellant gas in a pressurized package for the production of foam pads are known from U.S. Pat. No. 3,912,666. To the formulation disclosed there a non-ionic foam stabilizer is added. The foam has been described as being non-adhesive which is consistent with the intended application purpose for cleaning uses.

In U.S. Pat. No. 4,036,673 a method has been described for the production of an adhesive foam with the help of propellant gases from an aqueous dispersion with said foam collapsing after it has formed.

Furthermore, there are several plastic dispersions on the market that are formulated together with propellant gas in a pressurized package and yield a foam that is stable for a short time after foaming has taken place. This product is intended for the "mending of punctures in tires"; within the tire the foam distributes over the wall, collapses to form a film thus sealing punctured spots. Such a formulation has, for example, been described in U.S. Pat. No. 4,501,825.

The mechanism of film-forming has been described in literature in detail, cf. "Water-Born-Coatings", K. Dören et al, Hansa Publishers, München 1994. It is known, moreover, to control the film-forming process by additives such as associative thickeners, film-forming aids, fillers and the like, particularly with respect to optimizing the properties, for example with products of the paint industry, cf. "Wässrige Polymerdispersionen, Syntheseeigenschaften-Anwendung", D. Distler, Wiley-VCH, 1999. The production of foam and the theory of foam stabilization, in particular the production of aqueous foams, have also been covered in sufficient detail in literature, cf. "Handbook of Aerosoltechnology", p. 358 et seq., "Aqueous Aerosol Films", P. A. Sanders, Krieger Publishing, Florida 1979.

Latex foams have occasionally been described for applications with pressurized containers. WO-A-98/12 248 describes foamable compositions for application via pressurized containers in the form of stable foams that consist of an aqueous emulsion of a film-forming polymer, a liquid propellant and a solid, lilophilic and non-ionic surfactant having an HLB of roughly between 3 and 8 and, if necessary, of other additives. WO-A-98/12247 describes a foamable composition for application via pressurized containers that contain an aqueous emulsion of a film-forming polymer, a liquid propellant, a solid, wax-like foam stabilizer and a liquid lilophilic surfactant.

It has been shown that although the foamable compositions described in the latter two publications immediately after application yield a stable foam, this foam, however, collapses over time and on a long-term basis does not satisfy the requirements a good insulating foam must meet. Although the foam's pronounced tendency towards shrinkage may be alleviated by a well-aimed selection of non-ionic surfactants as foam stabilizers, this tendency cannot be eliminated entirely. What is more, the presence of non-ionic surfactants contributes towards instability of the produced foams under the influence of moisture, for example when high air humidity conditions prevail.

Nevertheless, there is demand for a fine-celled, elastic, non-shrinking foam that can be produced by means of a customary propellant mixture from an aqueous dispersion of a film-forming plastic material. It would be particularly desirable to have such a polyurethane foam.

This objective is achieved with the help of a composition that contains an aqueous dispersion of at least one film-forming plastic material consisting of 30% to 80% by weight of a film-forming plastic material, a propellant gas amounting to between 3% and 25% by weight in relation to the entire composition and one or more ionic foam stabilizers amounting to between 0.3 and 6% by weight in relation to the entire composition.

From the compositions known from the state-of-the-art the composition according to the invention relating to the production of foams out of pressurized containers differs in that primarily one anionic foam stabilizer amounting to between 0.3% and 6% by weight is present. A fine-celled, elastic and largely dimensionally stable foam is obtained that behaves mainly inertly under the influence of moisture.

Aside from their foam stabilizing effect the anionic foam stabilizers used according to the invention have another function that is they integrate the propellant gases into the aqueous phase. The formation of an oil-in-water emulsion serves as a model, i.e. the low-molecular-weight propellant gases are emulsified into the aqueous medium. It is assumed that for the formation of emulsified propellant gases in the aqueous phase also emulsified propellant gas 'pellets' are present apart from the dispersed polymer particles.

The main function of the stabilizers is to ensure the foam's stability during the film-forming process and during drying. Generally suitable are anionic, water-soluble foam stabilizers, resp. surfactants that after propellant gas driven foaming has taken place form Langmuir films at the interface between the constantly aqueous phase and the dispersed gas phase. Surprisingly, the stabilizing effect of ionic surfactants is significantly superior to that of non-ionic surfactants, particularly as far as foam yield and long-term stabilization are concerned. Of the ionic surfactants the anionic surfactants are preferred over the betaines and cationic ones.

The aqueous plastic dispersions generally used contain 30 to 80% by weight of one or more film-forming plastics, preferably 35 to 70% and in particular 40 to 60%, in relation to the weight of the dispersion. In general, suitable film-forming plastic materials are those that have a minimum film-forming temperature of less than 100° C., in particular those having a minimum film-forming temperature of less than 50° C. Suitable film-forming plastic materials that can be used as latex are, alone or in mixed state, those based on acrylic acid, lower alkyl acrylates, styrene, vinyl acetate and the like. Polymers on ethylene basis can be used as well as styrene acrylic copolymers, styrene butadiene copolymers or vinyl acetate ethylene copolymers. Especially preferred is the use of polyurethane latices, alone or in combination with the above mentioned latices. The aqueous plastic dispersions put to use are those that are commercially available. In principle, customary latices, especially those for the production of linings, are suitable for use in the compositions according to the invention. A list of examples can be found in U.S. Pat. No. 4,381,066.

To produce formulations resistant to frost the use of non-ionic polyurethane dispersions may prove to be expedient. Such polyurethane dispersions contain hydrophilic polyether chains built into the polymer, cf. Dieterich D., Aqueous Emulsions, Dispersions and Solutions of Polyurethanes, Synthesis and Properties, Prog. Org. Coat. 9 (1981) 281–340. Such polyurethane dispersions can be used alone and together with foam stabilizers of ionic nature, possibly also with non-ionic foam stabilizers.

With respect to the polyurethane latices mentioned earlier it is to be noted that these due to the hydrophilic and hydrophobic components existing in their molecules form extraordinarily stable dispersions that practically do not need any additional stabilizers. This is true both for polyurethanes on the basis of aromatic and aliphatic polyisocyanates, irrespective of whether they have been cross-linked with polyetherols or polyesterols. Furthermore, polyurethane latices in combination with the anionic foam stabilizers used according to the invention are capable of integrating propellant gases such as liquefiable hydrocarbons, dimethyl ether or liquefiable fluorocarbons of sufficient quantity into the aqueous dispersions and cause them to be finely distributed so that a remarkably fine-celled, elastic and still dimensionally stable foam is produced. Due to the fact that aqueous polyurethane dispersions have pronounced self-stabilizing characteristics there is, as a rule, no need to add the customary emulsifiers.

In the compositions according to the invention mixtures of various latices can be advantageously used. This, in particular, also applies to those latices that differ with respect to their minimum film-forming temperatures since it was found that at a minimum film-forming temperature below room temperature very fine-celled, soft elastic foams are obtained, whereas if the minimum film-forming temperature is above room temperature fine-celled foams are obtained that after drying over night appeared to be rather brittle. The combination of a latex having a film-forming temperature of 20° C. or less, particularly=0° C., with a latex having a minimum film-forming temperature above 20° C. results in the properties to be balanced out to a great extent so that a fine-celled, elastic, dimensionally stable foam is obtained that can be easily processed. As a rule, such mixtures should contain the two components with their weight relationship ranging between 30/70 and 70/30.

The compositions according to the invention may contain additives of customary nature such as, for example, flame retardants, thickeners, biocides, fungicides, algicides, anti-freeze agents, anti-corrosion agents, emulsifiers, fillers, film-forming aids and the like. This applies to such additives as they are customarily employed in the production of insulating foams, aqueous dispersions and compositions that are intended to be applied from pressurized containers.

As flame retardants those agents can be used that are customarily employed in insulating foams provided that such retardants are capable of being admixed to the aqueous dispersion. Preferred flame retardants are dispersions of flame retarding agents on polymer basis such as, for example, PVC dispersions, polyvinylidene chloride dispersions or polychloroprene latices as are available on the market.

As auxiliary agent for the thickening of the latices such thickening agents can be used as are, for example, employed for aqueous varnishes. Thickening may, in particular, become necessary if it is envisaged to use solid substances such as customary halogen-free flame retardants (ammonium polyphosphate, aluminum hydroxide, boric salts) or other functional additives as fungicides, insecticides, algicides and the like. Suitable thickening agents are, for example, cellulose derivates such as Methocel® 228, Methocel® A, Methocel® 311 (DOW Chemical), acrylate thickeners for aqueous systems e.g. A P1/1 (Münzing-Chemie) and Mirox AM (Stockhausen), polyurethane thickeners for aqueous systems e.g. Tafigel® PUR 40, Tafigel® PUR 55 (Münzing Chemie) as well as inorganic thickeners as bentonite, hectorite, montmorillonite, silicic acids (Aerosil® 200 from Degussa).

Especially thickeners based on short-chained polyurethanes, such as the Tafigel types, promote the formation of firm foams and are conducive to the formation of a homogenous cell structure when raw materials of low viscosity are used. Good stability is particularly desirable if vertical joints have to be foamed.

The combination of dispersions of film-forming polymers on non-polyurethane basis with thickeners on polyurethane basis yields compositions that in terms of quality are comparable to the polyurethane dispersions for the production of foam. As a result of the formation of stable structures in aqueous systems it is even possible to dispense with the addition of customary emulsifiers entirely or in part if polyurethane thickening agents are employed.

For special applications customary biocides can be added to the foams, for example to ward off or take precautionary measures against insect damage, algae growth or fungal attack.

As it has to be expected that the compositions according to the invention have to be stored under unfavorable conditions for prolonged periods of time before they are applied it may be useful and practical to add customary antifreeze agents and anti-corrosion agents. Examples of such agents are ethylene glycol, propylene glycol and diethylene glycol. Suitable anti-corrosion agents are alkanolamines.

Further additives are film-forming auxiliary agents capable of reducing the minimum film-forming temperature and such additives can be selected on the basis of the hydrophobic or hydrophilic qualities of the film-forming polymers according to Diestler, for example Texanol®, propylene glycol, Dowanol® DPM.

Due to the fact that the plastic dispersions are aqueous systems having a high water content it may be necessary to add auxiliary agents that ensure the solubility and dispersibility of the additives and propellant gases as well as the formation of a homogenous and stable phase. The formation of an oil-in-water emulsion serves as a model, i.e. the low-molecular-weight propellants and the additives used are emulsified into the aqueous medium.

In the event polyurethane dispersions are employed the use of emulsifiers can be dispensed with to a great extent. Otherwise, such emulsifiers can be used as they are employed in the production of plastic dispersions in emulsion polymerization, for pharmaceutical applications producing gels and creams and for the solubilization of colorants and dyestuff. Emulsifiers from the surfactants series are especially suited. Examples here are ethoxilated fatty alcohols, ethoxilated alkyl phenols, ethoxilated fatty acids, alkyl sulfates, alkyl ether sulfates, cocobetaines, alkylamidopropyl sulfobetaines, alkyl dimethyl benzyl ammonium bromides, sorbitan esters as sorbitan monopalmitate, -monosterarate and -monooleate, ethoxilated castor oil, ethoxilated hydrated castor oil and the like. Further nonionic emulsifiers and protective colloids that may also be used in combination with ionic emulsifiers are, for example, polyvinyl alcohols, polyvinyl pyrrolidon as well as amphiphilic block copolymers of ethylene oxide and propylene oxide, such as for example Pluronics$^R$ from BASF or Synperonics® from ICI Surfactants.

The anionic foam stabilizers as a rule are soaps and surfactants. These are present in an amount of between 0.3 and 6% by weight in relation to the entire composition, preferable in an amount ranging between 0.5 and 4% and in particular between approximately 1 and 3%. Preferably acceptable are soaps such as ammonium, sodium and potassium soaps, especially ammonium or sodium stearate, -laurate, -myristate and -palmitate.

Furthermore, suitable are also derivates of fatty acids of the general formula RCO—N (CH$_3$)CH$_2$COONa, where RCO denotes a lauric, myristic, palmitic, stearic or oleic acid residue. These fatty acid derivates are generally known as sarcosinates.

Furthermore, fatty alkyl ether carboxylates of the general formula R—(OCH$_2$CH$_2$)$_n$—OCH$_2$COONa can be used, where R denotes a fatty alkyl residue. Suitable are α-sulfo fatty acid methyl ester, fatty alkyl sulfates, fatty alkyl ether sulfates, alkyl phosphates and alkyl ether phosphates, alkyl benzene sulfonates, olefine sulfonates, alkane sulfonates as well as sulfo succinate or sulfo succinate of fatty acid alkanolamides.

Of the α-sulfo fatty acid esters those of formula RCH (SO$_3$H)(COOCH$_3$), and, respectively, their salts, are preferred, where R denotes a fatty alkyl residue. Especially preferred of the fatty alkyl sulfates is Stokal$^R$ SAF, an ether sulfate of C$_{12}$–C$_{15}$ fatty alcohol ethoxylates with 2 to 3 ethylene oxide units, approximately of formula C$_{12}$H$_{25}$ (OCH$_2$CH$_2$)$_{2-3}$OSO$_3$H, sodium salt.

The alkyl phosphates and alkyl ether phosphates are commercially available substances which applies also to the alkyl benzene sulfonates of which dodecyl benzene sulfonate is given preference. Of the olefine sulfonates the C$_{14}$- and C$_{16}$ homologs are preferred, of the alkane sulfonates those having 13 to 18 carbon atoms. It applies, in particular, that of the fatty acid derivates especially those having 10 to 20 carbon atoms are considered suitable.

Especially preferred anionic foam stabilizers are soaps and fatty alcohol sulfates (for example products of the company of Stockhausen, Krefeld, Germany) that are available on the market under the name of Stokal® STA and Sultafon® SAF. Using a combination of ammonium stearate and fatty alcohol sulfate a fine-tuning of the foam structure can be achieved.

As cationic foam stabilizers customary benzalkonium salts, alkyl trimethyl ammonium salts as well as fat alkonium salts may, for example, be used. As salts, particularly the chlorides and methosulfates are preferred. Examples are an alkyl dimethyl benzyl ammonium chloride of the tradename Empigen BAC 50, alkyl trimethyl ammonium methosulfate having the tradename of Empigen CM (both from Albright and Wilson), a C12–C14 alkyl benzyl dimethyl ammonium chloride known by the tradename of Servamine KAC 422 D (from Condea) as well as a stearalkonium chloride of tradename Ninox 4002 (from Stepan).

Preferred cationic foam stabilizers are, furthermore, lipophilically modified quaternized proteins, as are offered, for example, by The Mcintyre Group under the name of Macropro. These are hydrolized protein units that are for instance derived from hydrolized collagen, keratin, wheat protein, soja protein or hydrolized silk or milk and have been modified by means of natural lipide residue via a quarternary ammonium group.

Also suitable are metaines, i.e. surfactants of amphoteric character (zwitterions). Of suitable type are in this case fatty acid, amido alkyl betaines, for example coconut fatty acid amido propyl betain und coconut fatty acid amido propyl sulfobetain, and also fatty acid amphoacetates, e.g. lauroamphoacetate. Tradename products would be Ampholit JB 130 K made by Kondea, Ammonyl 675 SB from Sepik and Empigen CDL 60/P from Albright and Wilson.

The propellant gases used in the composition according to the invention are those that are customarily employed for the generation of foams in pressurized containers. Suitable are, in particular, liquefiable propellant gases such as propane, n-butane, isobutane, dimethyl ether, 1,1,1,2-tetrafluoromethane (R134a) and 1,2-difluoromethane (R152a), solely or in a mixture. Particularly preferred is a mixture of propane, isobutane and dimethyl ether. As supplementary and supporting media further propellant gases such as CO$_2$ or N$_2$O may be admixed. The propellant gas content of the entire composition amounts to between 3 and 25% by weight, preferably up to 20% by weight and in particular up to 12% by weight. For the production of sealing foams and strings a propellant gas content of between 3 and 5% by weight will be fully sufficient as a rule. For the production of sealing foams using CO$_2$ as propellant gas, for the most part or solely, is sufficient and preferred.

The latex types are selected in view of their film-forming temperature. A film-forming temperature of below 100° C. is of prime importance. However, the minimum film-forming temperature can be reduced to the desired range through the use of suitable film-forming auxiliary agents.

Especially preferred is the use of polyurethane dispersions as well as dispersions consisting of polyurethane and another film-forming agent, e.g. polyurethane acrylate combinations. For certain applications the use of hydrophobic film-forming agents may be useful, for example those of olefinic basis or having a high olefinic content, e.g. styrene butadiene copolymers and styrene acrylate copolymers. It has been noticed that when using high proportions of hydrophilic plastics, e.g. high proportions of vinyl acetate ethylene propolymer, the water absorption capability increases considerably resulting in the produced foam becoming saturated with water when the relative humidity is high causing it to partially dissolve and soften. This may lead to an internal collapse of the metastable foam and loss of the desirable thermal and sound insulating properties.

An overview of the latices than can be employed is given in Table 1. With regard to the polyurethane dispersions it is to be noted that for the production of UV stable foams the use of polyurethane based on aliphatic polyisocyanates is preferred.

Furthermore, the invention relates to pressurized containers filled with the above described composition and intended to apply insulating foams. These are customary aerosol or pressurized containers as used worldwide for various purposes, inter alia for the production of 1-component polyurethane insulating foams on the basis of isocyanate prepolymers. To improve the applicability of the compositions stored in such pressurized containers for longer periods of time it may be useful to integrate into the filled pressurized container an application aid in the form of a metal rod or steel ball facilitating the stirring or shaking of a dispersion that has settled down.

The compositions according to the invention are formulated as follows. Foam stabilizers and, if thought necessary, emulsifiers are thoroughly stirred into and thus added to the prepared latex mixture. When using water-insoluble components these must be initially dissolved in organic solvents and then slowly admixed with the latex. The fact that this process enables higher concentrations to be admixed than could be expected from its solubility in water is presumably due to the micell formation capability and/or the incorporation of surfactants into the lamellar layers of the dispersed polymer particles at the polymer-water interface.

Low-molecular-weight alcohols such as ethanol, propanol, isopropyl alcohol, butanol, isobutanol, tert-butanol, ethylene glycol, isobutyl glycol, diethylene glycol, 1-methoxy-2-propanol, 1-ethoxy-2-propanol and the like have turned out to be suitable organic solvents for the aqueous dispersions according to the invention.

If solutions are needed these are to be made in the presence of heat. Some systems, for example hexadecanoic acid, 40%, in isopropanol can only be worked for a few hours after they have cooled down since a pronounced micell build-up and the formation of liquid-crystalline structures will occur. Such structures can then be eliminated by heating and stirring.

It is obvious that the anionic surfactants can also be produced by a neutralization of the relevant acids in a basified aqueous dispersion or in an aqueous dispersion of a film-forming agent having basic functions.

TABLE 1

| Latex | % Solids | MFBT ° C. | pH | Viscosity mPas | Manufacturer | Remark |
|---|---|---|---|---|---|---|
| Styrene butadiene copolymerisates | | | | | | |
| Lipaton SB 4520 | 50 | 0 | 8.5 | 200 | Polymer-Latex, Marl | |
| Lipaton SB 5521 | 50 | 0 | 8.5 | 100 | Polymer-Latex, Marl | |
| Lipaton SB 5811 | 47 | 3 | 8 | 25 | Polymer-Latex, Marl | |
| Lipaton SB 5850 | 46 | 3 | 8 | 20 | Polymer-Latex, Marl | |
| DL 955 | 50 | 18 | 7 | 200 | DOW | |
| DL 980 | 50 | 0 | 5 | 250 | DOW | |
| Styrene acrylate copolymerisate | | | | | | |
| Lipalon X 3820 | 50 | 4 | 7.5 | 160 | Polymer-Latex, Marl | |
| Lucidene 375 | 45 | 85 | 8.5 | 350 | Morton International, Bremen | |
| Vinyl acetate ethylene copolymer | | | | | | |
| Vinnapas LL 7200 (Airflex 720) | 72 | | | 2300 | Air Products. Burghausen | |
| Polyurethane dispersion | | | | | | |
| U 500 | 40 | 0 | 7.4 | 400 | Alberdingk Boley, Krefeld | PUR/Polyether |
| U 600 A | 40 | 0 | 8 | 300 | Alberdingk Boley, Krefeld | |
| U 210 | 61 | 0 | 8 | 1000 | Alberdingk Boley, Krefeld | PUR/Polyether |
| U 300 | 40 | 0 | — | — | Alberdingk Boley, Krefeld | PUR/Polyether |
| U 650 | 40 | 0 | — | — | Alberdingk Boley, Krefeld | PUR/Polyether |
| Impranil DLNW 50 | 50 | — | — | — | Bayer AG | PUR/Polyether |
| Acrylate dispersion | | | | | | |
| AC 548 | 50 | 13 | 8 | 4500 | Alberdingk Boley, Krefeld | |
| AC 2535 | 50 | 20 | 7.5 | 3000 | Alberdingk Boley, Krefeld | |
| AC 31 | 50 | 40 | 7.5 | 1000 | Alberdingk Boley, Krefeld | |
| AC 2529 | 43 | 50 | 7 | 4500 | Alberdingk Boley, Krefeld | |
| AC 2509 | 50 | 80 | 7.5 | 500 | Alberdingk Boley, Krefeld | |
| Acrylic-methacrylic ester dispersion | | | | | | |
| AC 548 | 50 | 13 | 8 | 4500 | Alberdingk Boley, Krefeld | |

*MFBT = Minimum film-forming temperatur

After the addition of surfactants and, if thought necessary, emulsifiers further additives are incorporated and, when the pressurized container has been filled and closed off, the propellant gas is applied.

The invention is explained by way of the following examples.

EXAMPLES 1 TO 7

Pressurized containers were filled with compositions, as per Table 2, according to the invention, closed off and tested after some days of equilibration.

All compositions yielded foams having a weight per unit of volume of approximately 100 g/cm$^3$. Best results were achieved with compositions based on dispersions of polyurethanes or mixtures containing polyurethanes. In that case dimensionally stable, fine-celled, elastic foams were obtained that showed good to very good adhesive power.

From Example 5 it is evident that when using a non-ionic foam stabilizer (Brij 52) the foam lacks the durability that is necessary. After 24 hours the foam had collapsed; the composition is not suitable for the foaming of joints.

As a rule, dispersions not containing polyurethane yielded poorer results in that the foam either exhibited shrinkage (Example 3) or was brittle or crumbly (Example 4). However, the tendency towards crumbling could be set off by admixing polyurethane dispersion (Example 7).

All foams showed good adhesive power with respect to wood and other materials. This is particularly important for use in the building trade where insulating foams are routinely employed for the foaming of door and window casings.

When adjusting the compositions according to the invention to have a propellant gas content of between 3 and 5% by weight they are capable of being foamed in the form of sealing strings as are for instance applied in building joints but also in refrigerators.

The invention claimed is:

1. A composition on the basis of an aqueous plastic dispersion that can be foamed from pressurized containers and contains an aqueous dispersion of at least one film-forming plastic material consisting of 30% to 80% by weight of a film-forming plastic material, a propellant gas amounting to between 3% and 25% by weight in relation to the entire composition and one or more ionic foam stabilizers amounting to between 0.3 and 6% by weight in relation to the entire composition.

2. The composition according to claim 1, characterized in that the aqueous plastic dispersion contains 40 to 60% by weight of film-forming plastic material.

3. The composition according to claim 1, characterized in that the minimum film-forming temperature is below 100° C.

4. The composition according to claim 3, characterized in that the minimum film-forming temperature is below 50° C.

5. The composition according to claim 1, characterized in that the aqueous dispersion contains a polyurethane, a polyacrylate, a styrene butadiene copolymer, a vinyl acetate ethylene copolymer, an acrylic-methacrylic acid copolymer or a mixture of same.

6. The composition according to claim 5, characterized in that the aqueous dispersion contains a mixture of a polyurethane and another plastic material.

7. The composition according to claim 5, characterized in that two film-forming plastic materials are provided in the mixture at a mixing ratio of between 30/70 and 70/30 by weight, of which one has a minimum film-forming temperature of 20° C. or less and the other has a minimum film-forming temperature of more than 20° C.

8. The composition according to claim 1, characterized by customary additives in the form of flame retarding agents, thickeners, biocides, fungicides, algicides, antifreezing

TABLE 2

| Substance | 1 | 2 | 3 | 4 | 5 | 6 | 7 |
|---|---|---|---|---|---|---|---|
| U 210 | 82 | | | | 88 | 85 | |
| U 500 | | 82 | | | | | |
| U 600 A | | | | | | | 42 |
| AC 2529 | | | | 82 | | | 40 |
| DL 955 | | | 82 | | | | 2.5 |
| Stokal STA Sultafon SAF | 9 | 9 | 9 | 9 | | 9 | 2.5 |
| Brij 52 solution | | | | | 3 | | |
| ethox. nonyl phenol | | | | | | | 3 |
| Propane | 2 | 2 | 2 | 2 | 2 | | 4 |
| Isobutane | 3 | 3 | 3 | 3 | 3 | 3 | 2 |
| Dimethyl ether | 4 | 4 | 4 | 4 | 4 | 3 | 4 |
| Total | 100 | 100 | 100 | 100 | 100 | 100 | 100 |
| Cell pattern in 1 cm of joint | fine-celled | fine-celled | fine-celled, severe shrinkage | fine-celled | collapsed | compact, fine-celled | elastic |
| Elasticity | highly elastic | highly elastic | soft, non-elastic | brittle-crumbly | highly elastic | highly elastic | |
| Adhesive power | very good | very good | good | good | very good | very good | |

U 600 A = Polyurethane dispersion from Alberdingk Boley
U 210 = Polyurethane dispersion from Alberdingk Boley
U 500 = Polyurethane dispersion from Alberdingk Boley
Stokal STA (Stockhausen) = 30% Ammonium stearate in water
Brij 52 (FLUKA) = Cetyl alcohol, ethoxylated appr. 2 EO units, 50%, in isopropanol
DL 955 = Styrene butadiene dispersion from DOW Chemical
Sultafon SAF (Stockhausen) = 30% Fatty alcohol sulfate in Wasser
AC 2529 = Polyacrylate dispersion from Alberdingk Boley agents, fillers, anti-corrosion agents and/or emulsifiers of a total amount of up to 50% by weight in relation to the entire composition.

9. The composition according to claim 1, characterized in that the foam stabilizer(s) are of anionic, cationic or amphoteric nature.

10. The composition according to claim 9, characterized in that the foam stabilizer(s) are selected from carboxylates, denvates of fatty acids, fatty alkyl ether carboxylates, alpha-sulfo fatty acid methly ester, fatty alkyl sulfates, fatty alkyl ether sulfates, alkyl phosphates, alkyl ether phosphates, alkyl benzene sulfonates, alkane sulfonates, olefine sulfonates, sulfo succinate and/or sulfo succinate of fatty acid alkanolamides.

11. The composition according to claim 9, characterized in that the foam stabilizer(s) are selected from lipophilic, modified, quartemary proteins, benzalkonium salts, trimethyl alkyl ammonium salts and/or fatty alkonium salts.

12. The composition according to claim 9, characterized in that the foam stabilizer(s) are betaines.

13. The composition according to claim 1, characterized in that the foam stabilizers are present in an amount of between 1.0 and 4.0% by weight in relation to the entire composition.

14. The composition according to claim 1, characterized in that the propellant gas is a mixture of liquefiable propellant gases.

15. The composition according to claim 14, characterized in that the liquefiable propellant gases are propane, butane, isobutane and/or dimethyl ether.

16. The composition according to claim 1, characterized in that said composition contains $CO_2$ and/or $N_2O$ as propellant gas.

17. Use of the composition according to claim 1 for the production of sealing and insulating substances having hollow spaces, in particular for thermal insulation purposes, which comprises expelling said composition from a pressurized container and filling up hollow spaces of said sealing or insulating substance therewith.

18. Use according to claim 17 for the production of insulating strips.

* * * * *